L. S. FALES.
Processes and Apparatus for the Manufacture of Aqua-Ammonia.
No. 158,265. Patented Dec. 29, 1874.
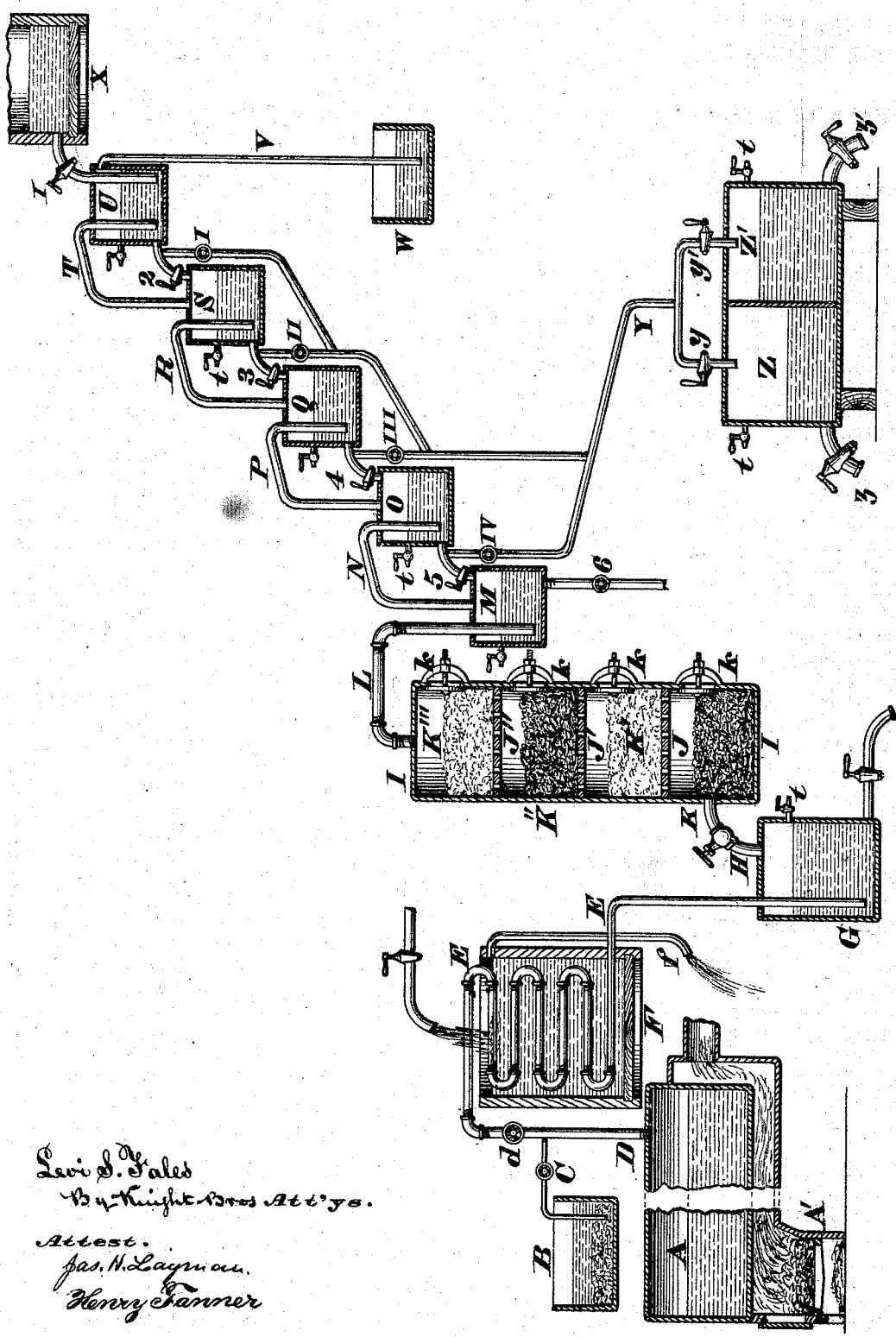

UNITED STATES PATENT OFFICE.

LEVI S. FALES, OF CINCINNATI, OHIO, ASSIGNOR TO THE CENTRAL CHEMICAL MANUFACTURING AND PACKING COMPANY, OF SAME PLACE.

IMPROVEMENT IN PROCESSES AND APPARATUS FOR THE MANUFACTURE OF AQUA AMMONIA.

Specification forming part of Letters Patent No. 158,265, dated December 29, 1874; application filed September 22, 1874.

*To all whom it may concern:*

Be it known that I, LEVI S. FALES, of Cincinnati, Hamilton county, Ohio, have invented a new and useful Process and Apparatus for the Manufacture of Aqua Ammonia from the ammoniated liquor of gas-works; and I hereby declare the following to be a full, clear, and exact description thereof, reference being had to the accompanying drawing, making part of this specification.

The great difficulty experienced heretofore in the manufacture of aqua ammonia from the ammoniated liquor of gas-works has arisen from the cost and time found necessary or expended in eliminating the sulphureted hydrogen, and various hydrocarbon impurities.

The crude liquor has had to be made first into sulphate of ammonia by means of sulphuric acid, all of which acid has been sacrificed, involving large and costly outlay, in acid and in lime for its neutralization.

To overcome the above difficulty, and produce a pure article of aqua ammonia at so little cost as to make profitable the utilization of the waste liquor of gas-works, (nearly all of which is at present thrown out or suffered to run away,) I have devised the apparatus and process which I now proceed to describe.

A is a simple close tank, which may have the form of a common cylindrical steam-boiler, and may be heated either by a furnace, A', or by steam. Into the boiler A the crude ammoniacal liquor is charged, and boiled for an hour and a half, the mingled sulphureted hydrogen and ammonia being conducted by pipe D into tank B containing sulphuric acid, which absorbs the ammonia so as to make sulphureted ammonia of commerce, the sulphureted hydrogen escaping or being employed for furnace purposes.

On its becoming evident that all, or nearly all, the sulphureted hydrogen has escaped, the cock C is closed and cock $d$ is opened, and the gas now flows, through worm E in cold-water vat or tank F, nearly to the bottom of tank G, in which the condensations of the gas accumulate in the form of a crude liquor, consisting largely of concentrated aqua ammonia, with hydrocarbon and other liquid impurities, and traces of sulphureted hydrogen. The vat F has a waste-spout, $f$.

This liquor, without further treatment, is available for various purposes for which crude aqua ammonia is employed, as for example, in the manufacture of illuminating gas, the preparation of fertilizers, the production of artificial ice, and various other purposes for which a chemically-pure article is not required, or it can be conveyed back to tank B, and in connection with sulphuric acid, be manufactured at once into sulphate of ammonia of commerce.

For the production of a chemically-pure aqua ammonia, I employ, in addition to the above, the following apparatus: A pipe, H, from the top of vessel G, passes into the bottom of a cylinder, I, having a series of grated or foraminous diaphragms, J J' J'', which divide the vessel into a number of compartments, K K' K'' K''', each of which has a manhole, $k$. Into the first compartment, K, I put a strong caustic mixture, such as caustic lime, in equal proportions with either soda-ash or potash. Into the second compartment, K', I put either animal or vegetable charcoal, of the grade known as granulated. The third compartment, K'', is similarly charged to the first, and the fourth compartment to the second, and so on alternately through the series.

From the top of cylinder I, a pipe, L, conducts to the bottom of another vessel, M, which is partly filled with sweet oil, cotton-oil, other vegetable oil, or alcohol.

The vapors having traversed this oil are conducted to the bottom of a similar vessel, O, which is kept half full of either distilled or well-filtered water. After the water has become saturated with ammonia, the residue escapes by pipe P to bottom of tank Q; also half filled with pure water, and thence through an ascending series of such vessels, as shown, in sufficient number to absorb or extract the whole of the ammonia. From the last of these vessels—say, U—any residue escapes by pipe V into an open vessel, W, containing sulphuric acid, which converts it into sulphate of ammonia. Somewhat higher than the highest tank U, is placed a reservoir of pure water, X, which communicates by cock 1 with tank $U^2$, similar cocks 2 3 4 5 6, affording similar communication with the successive tanks of the series, and finally enabling the discharge of the entire liquid contents from the lowest tank. Cocks I II III IV, communicating with the receiving ends of cocks 2, 3, 4, and 5, unite in a common pipe, Y, whose two fauceted branches $y\ y'$ discharge severally into two closed tanks, Z Z', or settlers, which may, by opening the appropriate faucets, be made to receive ammoniated water from any one or more tanks of the series. From these settlers or receptacles the aqua ammonia is discharged by faucets $z\ z'$, into suitable carboys or other vessels, for the market. $t$ are try-cocks to the various vessels.

All the above apparatus, except the boiler A, and possibly the cylinder I, are either formed entirely of lead, or are lined with that or other inert substance.

I claim herein as new and of my invention—

1. The process of making aqua ammonia from the spent liquor of gas-works, substantially as described—namely, by heating the liquor in a closed vessel, and so long as sulphureted hydrogen sensibly escapes, conducting the gas into a vessel charged with sulphuric acid, and after sulphureted hydrogen is no longer apparent, or but slightly so, conducting the gas through a cold worm into a closed condense-receiver, from thence into the lower compartment of a filter charged with alternate beds of charcoal and caustic alkalies, from the upper compartment of said filter into an oil-chamber, and from thence into an ascending series of closed vessels containing water, having communication from one to another consecutively, and also with a common branched pipe, which conducts into one or more settlers.

2. As an improvement in apparatus for manufacture of aqua ammonia, the sulphuric-acid tank or save-all, W, which communicates by pipe V from its lower part with the upper portion of the most elevated of the series of closed and communicating vessels P Q U, said tank serving to catch and utilize any residue of free ammonia, substantially as set forth.

In testimony of which invention I hereunto set my hand.

LEVI S. FALES.

Attest:
  GEO. H. KNIGHT,
  O. P. CAYLOR.